(No Model.)

J. J. HIGGINS.
FINDER FOR PHOTOGRAPHIC CAMERAS.

No. 366,584. Patented July 12, 1887.

WITNESSES:
C. Neveux
C. Sedgwick

INVENTOR:
J. J. Higgins
BY Munn & Co
ATTORNEYS.

UNITED STATES PATENT OFFICE.

JOHN J. HIGGINS, OF NEW YORK, N. Y.

FINDER FOR PHOTOGRAPHIC CAMERAS.

SPECIFICATION forming part of Letters Patent No. 366,584, dated July 12, 1887.

Application filed May 3, 1887. Serial No. 236,916. (No model.)

*To all whom it may concern:*

Be it known that I, JOHN J. HIGGINS, of the city, county, and State of New York, have invented a new and useful Improvement in Finders for Photographic Cameras, of which the following is a full, clear, and exact description.

This invention consists in a finder for photographic cameras adapted to provide for exposure in horizontal, vertical, or different planes of the object or objects to be found or focused before photographing them—as, for instance, when taking instantaneous pictures of animals or objects in motion—whereby increased conveniences are afforded for "finding" the object or objects in advance of or at the time of operating the shutter of the camera to expose the sensitized plate or tissue, substantially as hereinafter described.

Reference is to be had to the accompanying drawings, forming a part of this specification, in which similar letters of reference indicate corresponding parts in all the figures.

Figure 1:
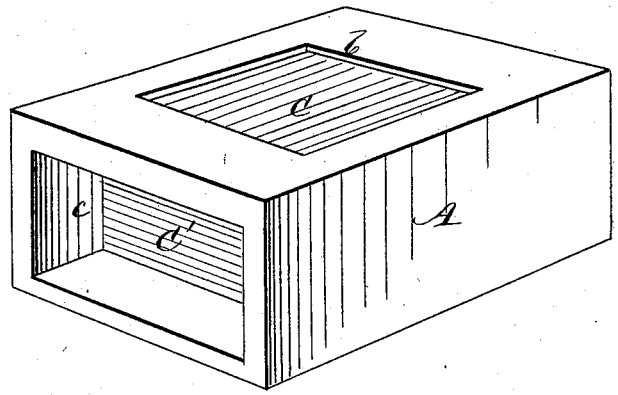
Figure 2:
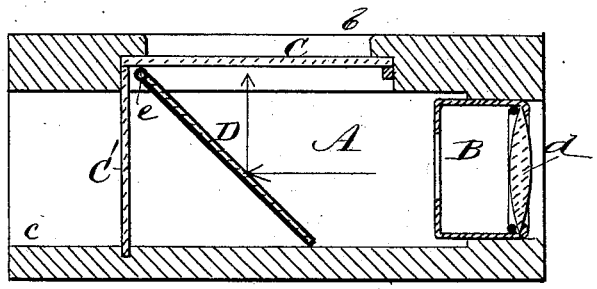

Figure 1 represents a view in perspective of a duplex photographic finder embodying my invention in one of its forms or modifications; Fig. 2, a vertical longitudinal section of said finder as adjusted for exposing the image by looking downward into the finder, and Fig. 3 a similar view of the same finder adjusted for looking directly from its back through the lens-tube.

While for the purpose of illustrating my invention I have here adopted a reversible finder-box, and which may be removable from the camera and placed or secured thereon as required, the same duplex feature may be applied to a finder which is not reversible, and which may be a permanent attachment to the camera-box, as will be hereinafter more fully explained.

The position of the finder on the camera may be the same as that of other finders; or it may be placed in any desired position on the camera.

A is the finder-box, which is provided with a horizontal view-aperture, *b*, and also with a rear vertical view-aperture, *c*.

B is the lens-tube of the finder, and *d* its lens.

C is a ground glass or other suitable translucent diaphragm applied to the horizontal view-aperture *b*, and C' a similar glass or diaphragm applied to the vertical view-aperture *c*.

Figure 3:
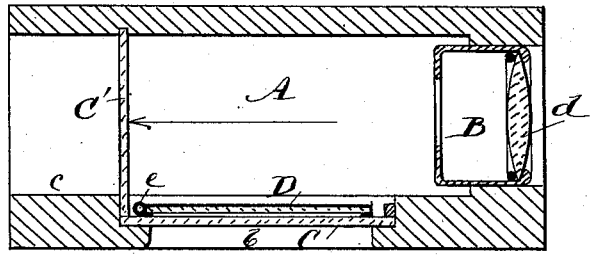

D is an adjustable or movable mirror, pivoted, for instance, at *e*, and arranged so that when the finder stands with its horizontal view-aperture *b* uppermost, as shown in Fig. 2, it will occupy within the box an angle of forty-five degrees to said aperture or its ground glass C, with the reflecting side of the mirror facing the lens-tube, and will then constitute an oblique reflecting-diaphragm for inspection through the aperture *b* or on the ground glass C of the object or objects to be found. When, however, the finder-box A is reversed or turned upside down—that is, with the horizontal view-aperture *b* undermost, as shown in Fig. 3—then the mirror D, falling, will shut down over said aperture and the vertical view-aperture *c* will be exposed for inspection of the object or objects to be found directly through the lens of the lens-tube or on the ground glass C'. This duplex character of the finder will be found exceedingly convenient—as, for instance, in cases where it would be impracticable or difficult, owing to the height of the camera, or for other reasons, to make the inspection down through the horizontal view-aperture *b* or see the image as reflected by the mirror on the ground glass C. The inspection may then be made through the vertical view-aperture *c* in line with the lens-tube, or the image be seen on the ground glass C'. Upon the other hand, when it is not convenient to inspect the object or objects to be found through the vertical view-aperture *c*, then the movable mirror may be called into action, and the inspection may be made through the horizontal view-aperture *b*.

It will be obvious that it is not absolutely necessary to make the finder removable or reversible to give it this duplex character, as it might be a fixture with its horizontal view-aperture *b* uppermost, and the movable mirror D be variously operated or adjusted to put it out of intercepting position between the lens-tube and the vertical view-aperture *c* when it is required to make the inspection through said vertical aperture. Thus, instead of the mirror automatically adjusting itself into position to make either view-aperture *b* or *c* available, as is or may be the case when the finder is made reversible, as described, it may be moved from the exterior of the finder-box by any suitable mechanical devices, proper means being provided for securing it in either adjusted position.

The invention is not restricted to any particular form of finder, which may be telescopic or otherwise; but I desire it to be distinctly understood that it relates to a finder proper, which is an adjunct or accessory to a camera, and not to the camera itself, although appended to the camera or removable therefrom, as desired; hence, and for other reasons, my invention essentially differs from a camera the oblong box or body of which has an opening in its rear for reception of the dark-slide, an orifice in front for the lens, another opening in the top closed by a focusing ground glass or translucent screen, and a movable mirror within said body capable of adjustment to shield the sensitive plate in the rear opening of the box and reflect the image, as found by the lens, on the focusing translucent screen in the top of the box, or to act as a shutter to said screen and expose the sensitive plate in the rear opening in the camera box or body to the action of the lens.

My device is a finder complete in itself, capable of attachment to or upon cameras of the ordinary or different constructions, and which is of a duplex character, as hereinbefore described. The lens with which it is shown provided is independent of the camera box or body, as are also the two ground glasses or translucent screens—the one horizontal and the other vertical—and likewise the movable mirror controlling said screens.

Having thus described my invention, what I claim as new, and desire to secure by Letters Patent, is—

1. In a finder for photographic cameras, a duplex finder distinct from or forming an accessory to the camera, the same being made substantially as described, and comprising a finder-box provided with horizontal and vertical view-apertures and a movable mirror controlling said apertures as desired.

2. In a photographic finder, the combination, with a finder-box having a horizontal view-aperture and a vertical view-aperture, ground glasses or translucent screens closing both of said apertures, and a movable mirror adapted to restrict the view to either of said screens or glasses, substantially as herein shown and described.

3. In a photographic finder, the combination of a finder-box having a horizontal view-aperture and a rear vertical view-aperture, ground glasses or translucent screens closing both of said apertures, a lens in the forward end of said box, and a movable mirror adapted to restrict the view to either of said screens, as desired, essentially as specified.

4. A reversible finder-box provided with horizontal and vertical view-apertures, ground glasses or translucent screens applied to said apertures, and an adjustable mirror, substantially as specified.

5. A reversible finder-box provided with a lens or lens-opening in front, a rear vertical view-aperture and a horizontal view-aperture, ground glasses or translucent screens applied to said view-apertures, and a self-adjusting mirror controlling said screen, essentially as described.

JOHN J. HIGGINS.

Witnesses:
EDGAR TATE,
E. M. CLARK.